United States Patent [19]
Iseki

[11] Patent Number: 5,830,302
[45] Date of Patent: *Nov. 3, 1998

[54] METHOD OF MAKING A PNEUMATIC RADIAL TIRE WITH CARCASS OVERLAP JOINT HAVING AT LEAST ONE CIRCUMFERENTIAL CUT

[75] Inventor: Tsutomu Iseki, Fukushima-ken, Japan

[73] Assignee: Sumitomo Rubber Industries, Ltd., Hyogo-ken, Japan

[*] Notice: The term of this patent shall not extend beyond the expiration date of Pat. No. 5,658,405.

[21] Appl. No.: 841,347

[22] Filed: Apr. 30, 1997

Related U.S. Application Data

[62] Division of Ser. No. 545,921, Oct. 20, 1995, Pat. No. 5,658,405.

[30] Foreign Application Priority Data

Oct. 21, 1994 [JP] Japan .................................. 6-282836

[51] Int. Cl.$^6$ ............................ B29D 30/38; B29D 30/46
[52] U.S. Cl. ............................................ 156/134; 156/159
[58] Field of Search .................................... 152/560, 558, 152/548; 156/134, 157, 159; 428/294.4, 295.7, 296.1, 57

[56] References Cited

U.S. PATENT DOCUMENTS 4,466,473  8/1984  Matyja et al. ..................... 152/560 X

FOREIGN PATENT DOCUMENTS 0 120623  10/1984  European Pat. Off. .
61-83025   4/1986  Japan ................................ 152/548

OTHER PUBLICATIONS

Patent Abstracts Of Japan, vol. 010, No. 270 (M–517), 13 Sep. 1986 & JP-A-61 094745 (Toyo Tire & Rubber Co. Ltd.), 13 May 1986.

*Primary Examiner*—Adrienne Johnstone

[57] ABSTRACT

A pneumatic radial tire comprises a radial carcass ply wound around the axis of the tire over one turn so that the terminal edge of the winding of the carcass ply overlaps with the starting edge thereof to define an overlap-joint part, the overlap-joint part provided in one of the starting edge and terminal edge with at least one cut by which carcass cords existing therein are cut, and a method of making the same comprises the steps of cutting the starting edge prior to winding a carcass strip or cutting the terminal edge prior to the end of winding a carcass strip.

3 Claims, 6 Drawing Sheets

Fig. 7
CONVENTIONAL
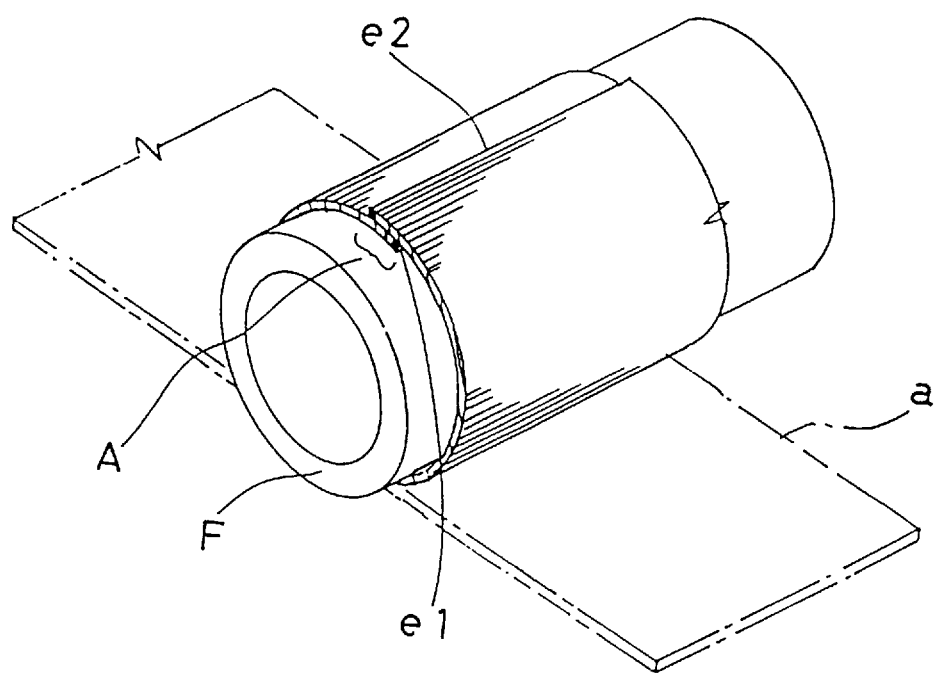

Fig.8
CONVENTIONAL
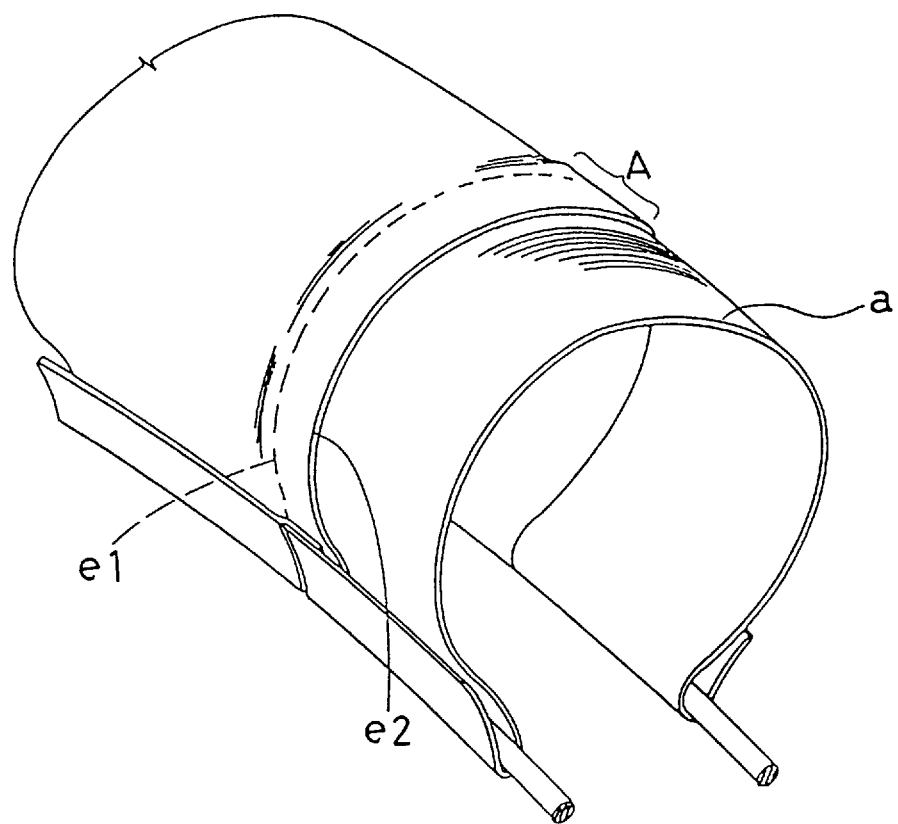

METHOD OF MAKING A PNEUMATIC RADIAL TIRE WITH CARCASS OVERLAP JOINT HAVING AT LEAST ONE CIRCUMFERENTIAL CUT

This application is a divisional of application Ser. No. 08/545,921, filed on Oct. 20, 1995, now U.S. Pat. No. 5,658,405, the entire contents of which are hereby incorporated by reference.

The present invention relates to a pneumatic radial tire and a method of making the same, in which occurrence of the dent resulting from a overlap-jointing of a carcass ply is decreased and the tire qualities such as uniformity, appearance, durability and the like can be improved.

BACKGROUND OF THE INVENTION

It is well known that the radial tires are excellent in high speed running performance because a rigid belt is disposed outside the carcass crown portion such that the tread rigidity is increased. Further, the belt decreases a load on the carcass, which makes it possible to reduce the number of the carcass plies.

When making a conventional radial tire, as shown in FIG. 7, a carcass ply strip (a) is wound in a cylindrical shape on a former F, and the terminal edge 2 of the winding is overlapped with the starting edge 1 thereof to connect or joint thereto. In the finished tire, as shown in FIG. 8, this overlap-joint part (A) extends in the radial direction along the carcass cords. As a result, when the tire is inflated, a so called "joint-dent", a phenomenon that the outer surface of the sidewall portion dents along the overlap-joint part (A), is caused. In particular, if the joint-dent exceeds 0.4 mm, the tire appearance, durability, uniformity and the like are greatly deteriorated. Further, the dent is remarkable when the number of the carcass plies is small, especially when the carcass consists of a single ply, thereby a tire weight reduction can be hindered.

If the width-of the overlap-joint part (A) is decreased to reduce the joint-dent, the carcass ply opens at the overlap-joint part (A) during shaping of the carcass, and the prevention of the opening necessitates an overlapping of at least two to four carcass cords.

SUMMARY OF THE INVENTION

It is therefore, an object of the present invention to provide a pneumatic radial tire in which the joint-dent is reduced.

Another object of the present invention is to provide a method of making such a pneumatic radial tire.

According to one aspect of the present invention, a pneumatic radial tire comprises at least one carcass ply of cords extending between bead portions through a tread portion and sidewall portions and turned up around bead cores, the carcass ply being wound around the axis of the tire over one turn so that the terminal edge of the winding of the carcass ply overlaps with the starting edge thereof to define an overlap-joint part, wherein the overlap-joint part is provided in one of the starting edge and terminal edge with at least one cut along the circumferential direction of the tire by which carcass cords existing therein are cut.

According to one aspect of the present invention, a method of making the pneumatic radial tire comprises the steps of winding a carcass strip on a former around the axis of the former over one turn to form the carcass ply, overlapping the terminal edge with the starting edge of the winding of the carcass strip to form the overlap-joint part, and cutting one of the starting edge and terminal edge in the overlap-joint part along the circumferential direction of the tire at at least one position to form at least one cut by which carcass cords existing therein are cut.

In the above-mentioned conventional overlap-joint part (A), the number of the carcass cords which extend continuously from bead to bead increases in comparison with the remaining part, and as a result, the cord tension becomes relatively small and the cord elongation becomes relatively decreased. Accordingly, a dent is formed along the overlap-joint part.

However, in the overlap-joint part of the present invention, cords existing therein are cut and lose a function as a tension member. Therefore, the cord tension can be evened, and the joint-dent can be effectively prevented.

Further, it becomes possible to provide a sufficient overlapping width without causing a dent, and accordingly, the above-mentioned opening of the overlap-joint part during shaping of the carcass can be prevented. As a result, the tire manufacturing efficiency and working efficiency can be improved.

BRIEF DESCRIPTION OF THE DRAWINGS

Embodiments of the present invention will now be explained according to drawings.

FIG. 7 is a schematic perspective view showing the conventional carcass strip wound on a former.

FIG. 8 is a schematic perspective view showing the conventional carcass in the finished tire.

DETAILED DESCRIPTION OF THE DRAWINGS

Figure 1:
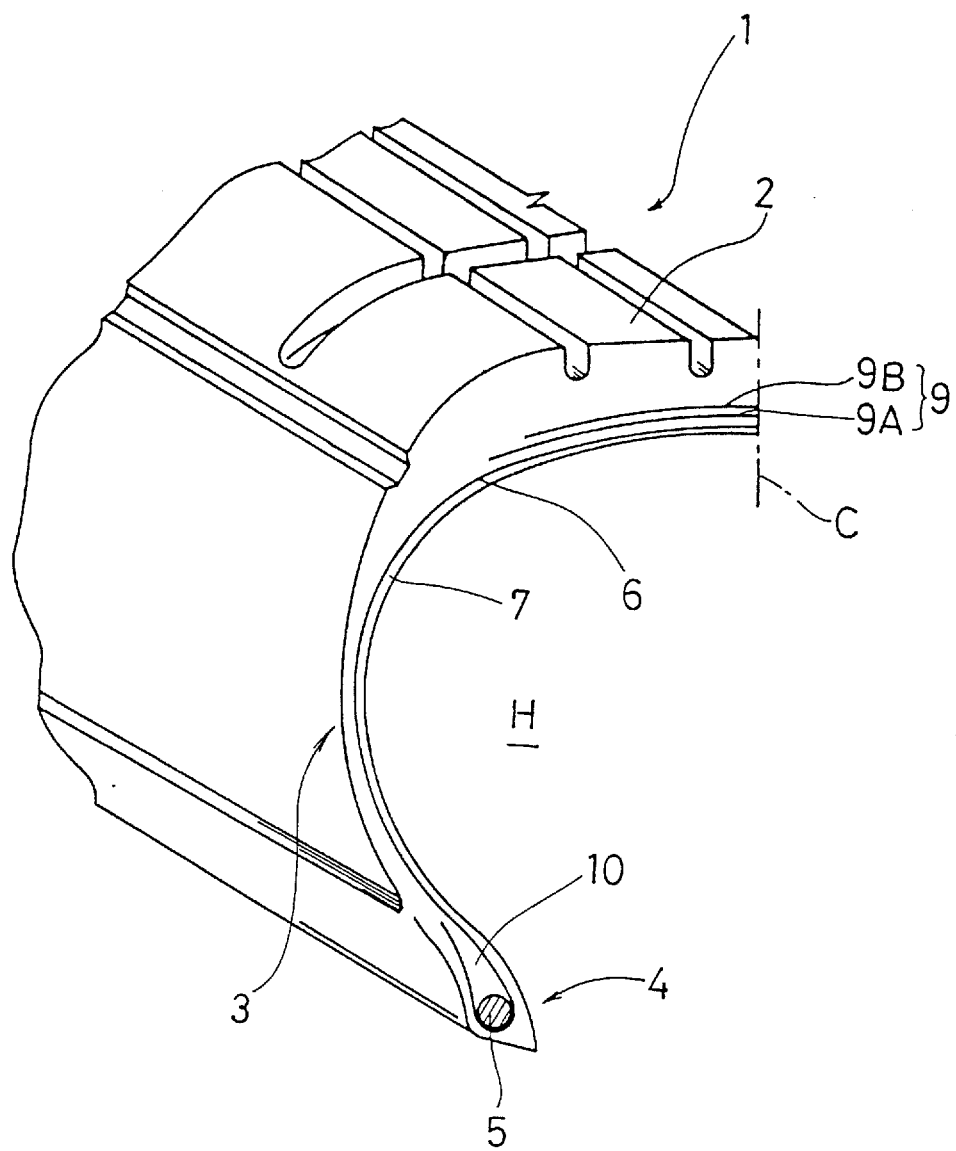
FIG. 1 is a schematic perspective view showing a pneumatic radial tire according to the present invention.

In the drawings, a pneumatic radial tire 3 according to the present invention is a tubeless radial tire.

The tire 1 comprises a tread portion 2, a sidewall portion 3 extending radially inwardly from each edge of the tread portion, a bead portion 4 disposed at the radially inner end of each sidewall portion 3, a bead core 5 disposed in each bead portion 4, a carcass 6 extending between the bead portions 4, an inner liner 7 disposed on the inside of the carcass 6 and facing the tire cavity H, and a stiff belt layer 9 disposed outside the carcass 6 in the tread portion 2.

The inner liner 7 is an air-tight rubber layer made of, for example, butyl rubber and protects the inner surface of the carcass 6.

The belt layer 9 in this embodiment comprises a radially inner belt ply 9A and a radially outer belt ply 9B, each ply made of cords laid at, for example, an angle of not more than 30 degrees with respect to the tire equator C, so that the cords in the belt ply 9A are laid crosswise to the cords in the belt ply 9B, to reinforce the substantially whole width of the tread portion 2 and to increase the tire rigidity.

For the belt cords, various cords such as organic fiber cords, e.g. nylon, rayon, polyester and aromatic polyamide, inorganic fiber cords, e.g. steel cords and the like can be used.

Figure 2:
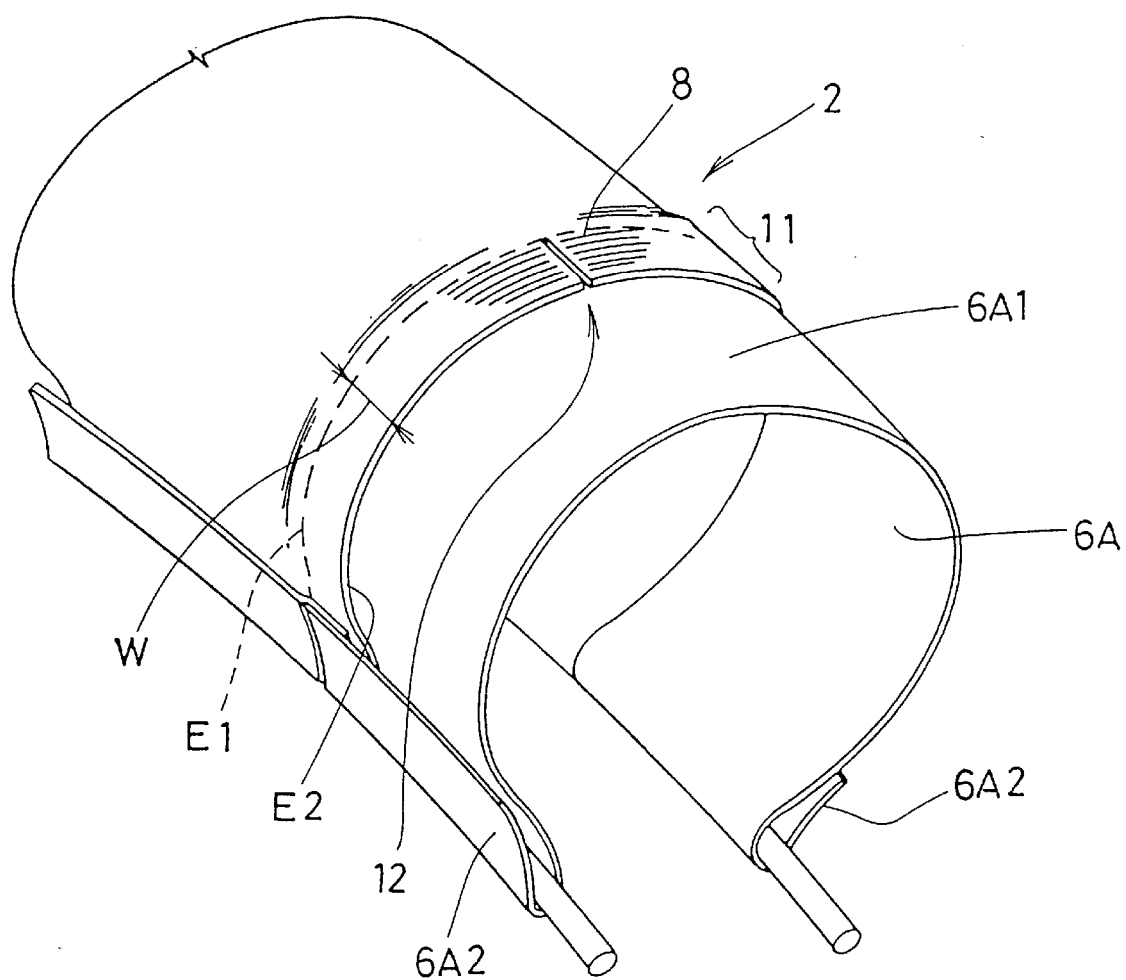
FIG. 2 is a schematic perspective view showing the carcass thereof.

The carcass 6 consists of at least one radial ply 6A, in this embodiment, as shown in FIG. 2, consists of a single carcass ply 6A. The carcass ply 6A is made of carcass cords 8 arranged at an angle of substantially 90 degrees, about 80 to 90 degrees, with respect to the tire equator C. The carcass ply 6A extends between the bead portions 4 through the tread portion 2 and sidewall portions 3 and turned up around the bead cores 5 from the axially inside to the outside of the tire to form a pair of turned up portions 6A2 and a toroidal main portion 6A1 therebetween.

For the carcass cords 8, various cords such as organic fiber cords, e.g. nylon, rayon, polyester and aromatic polyamide, inorganic fiber cords, e.g. steel and the like can be used.

Between the main portion 6A1 and turned up portions 6A2, each bead portion 4 is provided with a bead apex rubber 10 extending radially outwardly taperingly from the radially outer surface of the bead core 5 so as to reinforce the bead portion and sidewall lower portion and to increase the tire rigidity.

The carcass ply 6A is wound circumferentially of the tire over one turn so that the terminal edge E2 of the winding or windings overlaps with the starting edge E1, defining an overlapping part 11.

According to the present invention, carcass cords 8 in the carcass main portion 6A1 in the overlap-joint part 11 are cut so that at least one cut 12 is provided in one of the starting edge E1 and the terminal edge E2.

In FIG. 2, only the radially outward terminal edge E2 is provided on the tire equator C with only one cut 12 extending in the circumferential direction of the tire.

Accordingly, the overlap-joint part 11 decreases in the pull resistance and is allowed to elongate or expand by applying the tire inner pressure. As a result, the joint-dent can be reduced.

Besides the tread portion 2, such a cut 12 can be provided in a tire shoulder portion 14 and/or sidewall portion 3.

Figure 5:
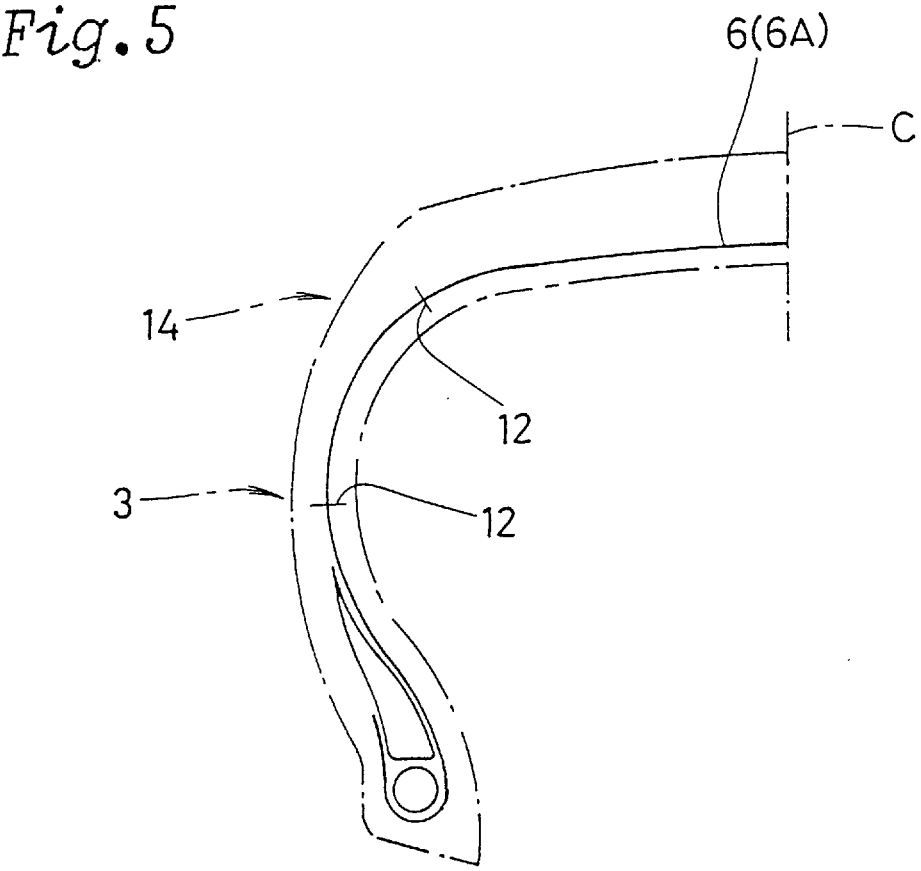
FIG. 5 is a diagram for explaining another example of the cuts.

In FIG. 5, five cuts 12 are provided, one cut in the tread center, two cuts in the shoulder portions 14 and two cuts in the sidewall portions 3. If a plurality of cuts 12 are provided, the cuts are preferably arranged symmetrically about the tire equatorial plane C.

The width W of the overlap-joint part 11 is preferably set to correspond to 3 to 8 carcass cords, that is, 3 to 8 times the cord diameter+the cord space. If the width W is less than 3 cords, the overlap-joint part 11 is liable to open at the time of shaping the carcass. If more than 8 cords, it is difficult to keep the dent under 0.4 mm.

When the carcass 6 consists of a plurality of plies 6A and as a result a plurality of overlapping parts 11 are formed in different circumferential positions, each of the overlapping parts 11 must be provided with at least one cut 12 as explained above. However, the effect of controlling the occurrence of joint-dent is most remarkable when the carcass 6 consists of a single ply 6A.

Figure 3:
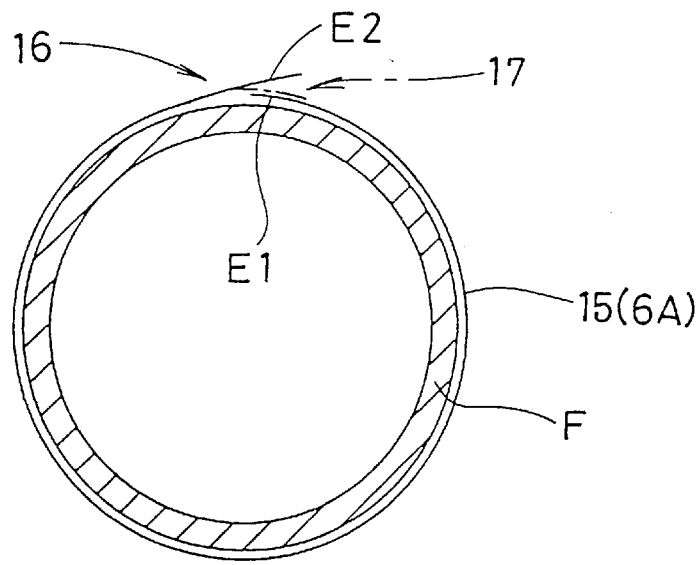
FIG. 3 is a schematic cross sectional view for explaining the steps of winding the carcass strip and forming the overlap-joint part.
Figure 4:
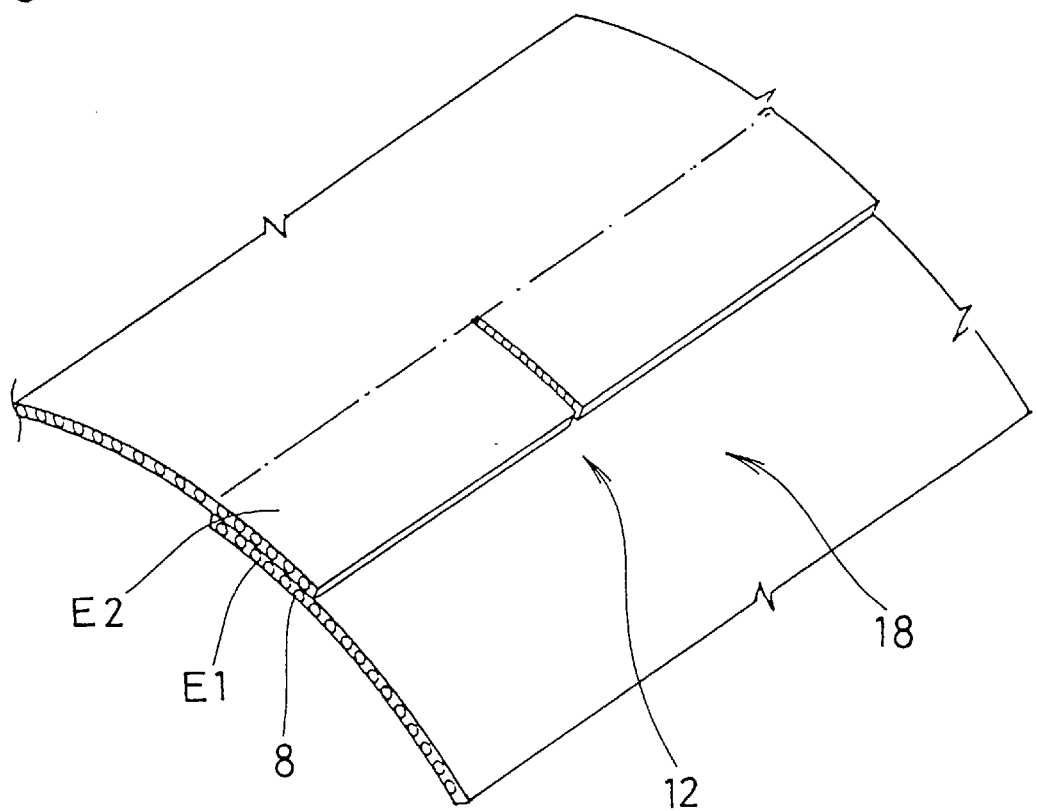
FIG. 4 is a schematic perspective view for explaining the step of forming the cut.

According to the present invention, a method of making the tire 1 comprises the steps of winding a carcass strip 15 on the former F around the axis thereof over one turn to form the carcass ply 6A as shown in FIG. 3, overlapping the terminal edge E2 with the starting edge E1 of the winding of the carcass strip 15 to form the overlap-joint part 11 as shown in FIG. 4, and cutting one of the starting edge E1 and the terminal edge E2 of the overlap-joint part 11 along the tire circumferential direction at at least one position to form at least one cut 12 by which carcass cords 8 existing therein are cut as shown in FIGS. 4 and 5.

Example tires having the structure shown in FIG. 1 and a conventional tire having the carcass structure shown in FIG. 8 were made and measured for the joint-dent. The results are shown in FIG. 6.

Figure 6:
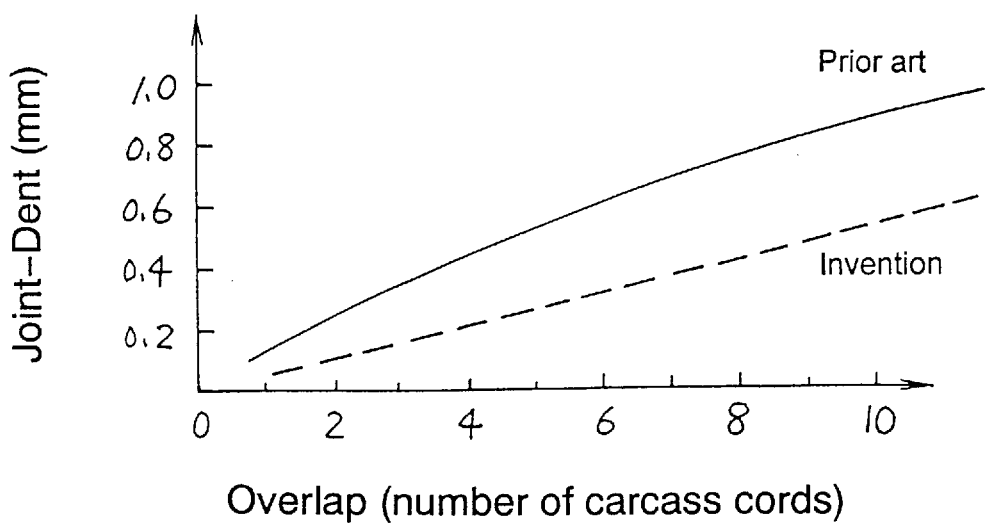
FIG. 6 is a diagram showing the effect of the present invention.

As shown in FIG. 6, it was confirmed that the dent of the Example tires was decreased to about one half of that of the prior art tire, and the tire uniformity, appearance, durability and the like were improved.

Further, it was confirmed that the number of the carcass cords existing in an overlapping part could be increased up to eight while maintaining the joint-dent in the range of less than 0.4 mm, and the tire manufacturing efficiency and working efficiency could be improved. The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

I claim:

1. In a method of making a pneumatic radial tire, the improvement comprising the steps of, winding a carcass strip around the axis of a former over one turn to form a carcass ply, overlapping the terminal edge with the starting edge of the winding of said carcass strip to form an overlap part, and cutting one of said starting edge and terminal edge in said overlap part at one position to form only one cut extending in a circumferential direction of the tire by which carcass cords existing therein are cut.

2. The method of making a pneumatic radial tire according to claim 1, wherein said one of said starting edge and terminal edge is said starting edge and the step of cutting the starting edge is prior to the step of winding the carcass strip.

3. The method of making a pneumatic radial tire according to claim 1, wherein said one of said starting edge and terminal edge is said terminal edge and the step of cutting the terminal edge is prior to the end of the step of winding the carcass strip.

* * * * *